United States Patent
Schlangen et al.

(10) Patent No.: US 10,852,158 B1
(45) Date of Patent: Dec. 1, 2020

(54) DISTANCE SENSOR TEST SYSTEM

(71) Applicant: Kitty Hawk Corporation, Palo Alto, CA (US)

(72) Inventors: Joseph E. Schlangen, Dayton, OH (US); Sharbel Karam, Sunnyvale, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

(21) Appl. No.: 16/585,430

(22) Filed: Sep. 27, 2019

(51) Int. Cl.
*G01C 25/00* (2006.01)
*G01S 7/497* (2006.01)
*G01S 7/40* (2006.01)

(52) U.S. Cl.
CPC ............ *G01C 25/00* (2013.01); *G01S 7/40* (2013.01); *G01S 7/497* (2013.01)

(58) Field of Classification Search
CPC ......... G01C 25/00; G01S 7/40; G01S 7/4004; G01S 7/497; G01S 7/4808; G01S 13/02
See application file for complete search history.

(56) References Cited

U.S. PATENT DOCUMENTS

| | | | | |
|---|---|---|---|---|
| 3,706,284 A * | 12/1972 | Plasser | ..................... | E01B 27/17 104/7.2 |
| 3,750,299 A * | 8/1973 | Plasser | ..................... | E01B 27/17 33/287 |
| 4,471,530 A * | 9/1984 | Kirven | .................. | G01B 11/24 33/286 |
| 5,311,191 A * | 5/1994 | Scannapieco | ......... | G01S 7/4052 342/1 |
| 5,314,037 A * | 5/1994 | Shaw | .................. | B60R 16/0231 180/169 |
| 5,852,410 A * | 12/1998 | Berger | ..................... | G01S 7/497 340/903 |
| 5,930,904 A * | 8/1999 | Mualem | .................. | G01C 5/00 33/1 Q |
| 6,008,754 A * | 12/1999 | Roos | ..................... | G01S 7/4004 342/120 |
| 6,636,172 B1 * | 10/2003 | Prestl | ..................... | G01S 7/4026 342/173 |
| 6,812,885 B2 * | 11/2004 | Brettner, III | .......... | G01S 7/4004 342/118 |
| 6,865,138 B1 * | 3/2005 | Li | .......................... | B60Q 9/006 340/436 |
| 7,501,980 B2 * | 3/2009 | Focke | ....................... | G01S 7/40 342/174 |

(Continued)

OTHER PUBLICATIONS

Patel, A. (Dec. 10, 2018). Ultrasound Sensor: 2D Tracking With Arduino. Retrieved Jan. 16, 2020, from https://www.instructables.corn/id/Ultrasound-Sensor-2D-Tracking-With-Arduino/.*

(Continued)

*Primary Examiner* — Alexander A Mercado
(74) *Attorney, Agent, or Firm* — Van Pelt, Yi & James LLP

(57) ABSTRACT

A distance sensor and a measured object are positioned at a known distance from each other. A measured distance between the distance sensor and the measured object is obtained from the distance sensor, where the distance sensor uses a plurality of signals at a plurality of angles to generate the measured distance. The known distance and the measured distance are compared in order to test the distance sensor and produce a test result.

7 Claims, 10 Drawing Sheets

(56) References Cited

U.S. PATENT DOCUMENTS

| | | | | |
|---|---|---|---|---|
| 7,853,374 B2* | 12/2010 | Ko | | G01S 17/87 |
| | | | | 33/286 |
| 8,410,975 B1* | 4/2013 | Bell | | G01S 7/40 |
| | | | | 342/120 |
| 9,170,101 B2* | 10/2015 | Stieff | | G01S 7/4026 |
| 9,911,189 B1* | 3/2018 | Vawter | | G01S 17/89 |
| 10,338,213 B1* | 7/2019 | Faulhaber | | G01S 7/41 |
| 2003/0227615 A1* | 12/2003 | Montgomery | | G01C 11/06 |
| | | | | 356/139.03 |
| 2004/0036795 A1* | 2/2004 | Fujii | | H04N 5/23212 |
| | | | | 348/349 |
| 2004/0101163 A1* | 5/2004 | Kumagai | | G01C 15/002 |
| | | | | 382/103 |
| 2004/0136012 A1* | 7/2004 | Kyle | | G01S 5/163 |
| | | | | 356/614 |
| 2006/0017609 A1* | 1/2006 | Hager | | G01S 7/40 |
| | | | | 342/174 |
| 2010/0066995 A1* | 3/2010 | Rindle | | G01S 7/4817 |
| | | | | 356/5.03 |
| 2011/0231039 A1* | 9/2011 | Leitel | | G01P 3/22 |
| | | | | 701/19 |
| 2011/0298655 A1* | 12/2011 | Leva | | G01S 13/9023 |
| | | | | 342/25 C |
| 2012/0092643 A1* | 4/2012 | Rintanen | | B66C 13/46 |
| | | | | 356/4.01 |
| 2013/0110314 A1* | 5/2013 | Stieff | | G01B 11/275 |
| | | | | 701/1 |
| 2014/0144862 A1* | 5/2014 | Rintanen | | B66C 13/46 |
| | | | | 212/276 |
| 2014/0347649 A1* | 11/2014 | Gehrke | | B66B 5/0037 |
| | | | | 356/4.01 |
| 2015/0002638 A1* | 1/2015 | Suzuki | | B60R 11/04 |
| | | | | 348/47 |
| 2017/0003141 A1* | 1/2017 | Voeller | | G01B 11/272 |
| 2018/0188022 A1* | 7/2018 | Leikert | | G01B 11/2755 |
| 2018/0195989 A1* | 7/2018 | Scaboo | | B01F 7/162 |
| 2018/0202777 A1* | 7/2018 | Green | | F41J 1/10 |
| 2019/0187249 A1* | 6/2019 | Harmer | | G01S 7/40 |
| 2019/0317218 A1* | 10/2019 | Cao | | G01S 7/4808 |
| 2019/0324134 A1* | 10/2019 | Cattle | | G01S 13/931 |
| 2019/0353754 A1* | 11/2019 | Namba | | G01S 17/10 |
| 2020/0011703 A1* | 1/2020 | Voeller | | G01C 3/02 |

OTHER PUBLICATIONS

Theotokis, G. (Apr. 10, 2016). Measuring HC-SR04 accuracy. Retrieved Jan. 16, 2020, from https://www.youtube.com/watch?v=ZuM-rcdqfrQ.*

S. Scherr et al., "Influence of Radar Targets on the Accuracy of FMCW Radar Distance Measurements," in IEEE Transactions on Microwave Theory and Techniques, vol. 65, No. 10, pp. 3640-3647, Oct. 2017. (Year: 2017).*

M-683 Piezo Motorized Precision Translation Stage. (n.d.). Retrieved Apr. 21, 2020, from https://static.pi-usa.us/fileadmin/user_upload/pi_us/files/product_datasheets/M683_Precision_Positioning_Stage.pdf (Year: 2020).*

M-413 High-Load Linear Stage. (n.d.). Retrieved Apr. 21, 2020, from https://www.pi-usa.us/en/products/positioning-stages-linear-rotary-motorized-precision/precision-motorized-linear-stages/m-413-high-load-precision-stage-701754/#description (Year: 2020).*

How does LiDAR work? (n.d.). Retrieved Apr. 21, 2020, from http://www.lidar-uk.com/how-lidar-works/ (Year: 2020).*

The Difference Between Ball Bearings and Roller Bearings. (n.d.). Retrieved Nov. 29, 2018, from http://www.vncbearing.com/roller-bearings-vs-ball-bearings-major-differences/ (Year: 2018).*

* cited by examiner

DISTANCE SENSOR TEST SYSTEM

BACKGROUND OF THE INVENTION

New types of vehicles are being developed that can perform vertical takeoffs and landings. In some cases, the vehicles are autonomously piloted. This may be desirable because the vehicles may be single-seat vehicles and autonomous flight enables more types of people (e.g., beyond experienced and/or licensed pilots) to ride the vehicle and/or it may be safer than permitting the single occupant to fly the vehicle. To support autonomous flight, such vehicles have accurate altitude sensors (more generally referred to as distance sensors). In some cases, these distance sensors are built in-house (e.g., by the vehicle manufacturer) to meet a specific set of requirements that off-the-shelf distance sensors do not support. New devices and/or techniques to support these new distance sensors would be desirable.

BRIEF DESCRIPTION OF THE DRAWINGS

Various embodiments of the invention are disclosed in the following detailed description and the accompanying drawings.

DETAILED DESCRIPTION

Figure 1:
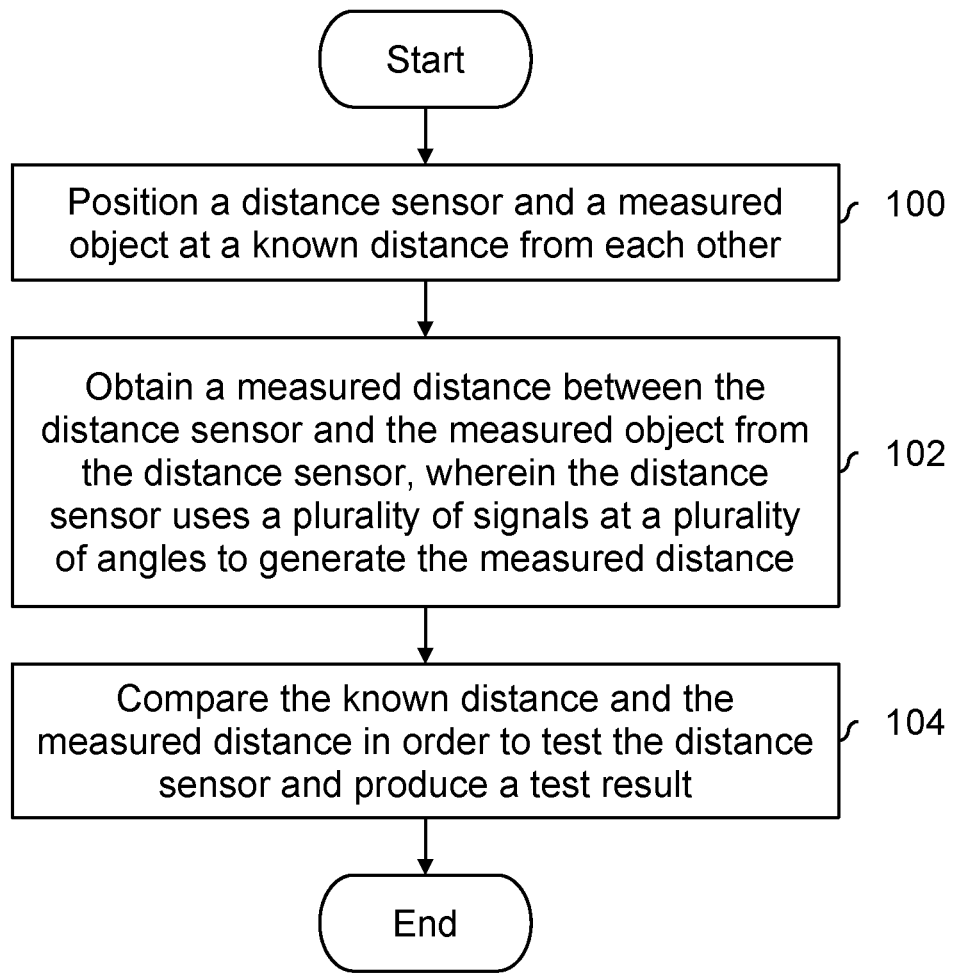
FIG. 1 is a flowchart illustrating an embodiment of a process to test a distance sensor.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of techniques and/or devices to test a distance sensor are described herein. In some embodiments, the test system includes positioning equipment (e.g., that moves the distance sensor and/or a measured object) to position a distance sensor and a measured object (e.g., the (actual) ground plane or a ground simulator) at a known distance from each other. The system may also include a test controller that obtains a measured distance between the distance sensor and the measured object from the distance sensor (e.g., where the distance sensor uses a plurality of signals at a plurality of angles to generate the measured distance) and compares the known distance and the measured distance in order to test the distance sensor and produce a test result. As will be described in more detail below, in various embodiments, the distance sensor may be tested prior to installation in some larger system (e.g., after manufacturing and before installation into a vehicle) and/or after the distance sensor is installed in and/or attached to a larger system (e.g., a distance sensor that is tested while the distance sensor is attached to a vehicle).

FIG. 1 is a flowchart illustrating an embodiment of a process to test a distance sensor. In some embodiments, the test is performed on a distance sensor that is attached to a vehicle, such as a multicopter that is capable of taking off from and/or landing on water, if desired. In some embodiments, the test is performed on an uninstalled and/or unattached distance sensor. For example, after manufacturing, distance sensors may be tested as described below before they are sold and/or distributed. In various embodiments, the process may be performed by positioning equipment, a test controller, and/or a test user interface.

At 100, a distance sensor and a measured object are positioned at a known distance from each other. As used herein, a measured object refers to an object or thing for which a distance is measured by the distance sensor. To put it another way, the distance sensor measures the distance to the measured object. In some embodiments, the measured object is a ground simulator, which includes a planar surface, and simulates the ground but is not actually the ground plane itself. In some other embodiments, the measured object is the actual ground.

In various embodiments of step 100, positioning equipment moves the measured object and/or distance sensor (i.e., one or both of them) so that they can be positioned at one or more known distances from each other. As will be described in more detail below, in some embodiments the positioning equipment includes a rail and a carriage system and a coupled ground simulator and carriage are movable along the rail and the distance sensor is stationary. Alternatively, the measured object (e.g., either the ground plane or a ground simulator) may be stationary and the distance sensor may be moved.

At 102, a measured distance between the distance sensor and the measured object is obtained from the distance sensor, wherein the distance sensor uses a plurality of signals at a plurality of angles to generate the measured distance. For example, the distance sensor may be a radar or Lidar-based sensor that transmits radar or Lidar signals at multiple angles and calculates a distance based on the received signals that are reflected back from the measured object. As will be described in more detail below, in some embodiments, the ground sensor outputs or otherwise broadcasts its measured distances over a wireless channel. In some such embodiments, a testing controller obtains the measured distance(s) from the wireless channel and compares the received measured distance(s) against the known distance between the measured object and the distance sensor.

At 104, the known distance and the measured distance are compared in order to test the distance sensor and produce a test result. In one example, the distance sensor is tested at multiple distances and there may be some permitted margin of error. A test controller may compare the various measured and known distances and declare that the distance sensor has passed testing if the distance sensor is within the permitted margin of error for all of the compared distances. Otherwise, the distance sensor fails testing.

In various embodiments, the test system includes a user interface which displays a visual indication of the test result (e.g., PASS or FAIL, a green light or a red light, etc.) and/or an audible indication of the test result (e.g., a harmonious and/or pleasant sound for a pass or a dissonant and/or discordant sound for a fail).

The following figure shows one example system which may be used to perform the exemplary testing process described above.

Figure 2:
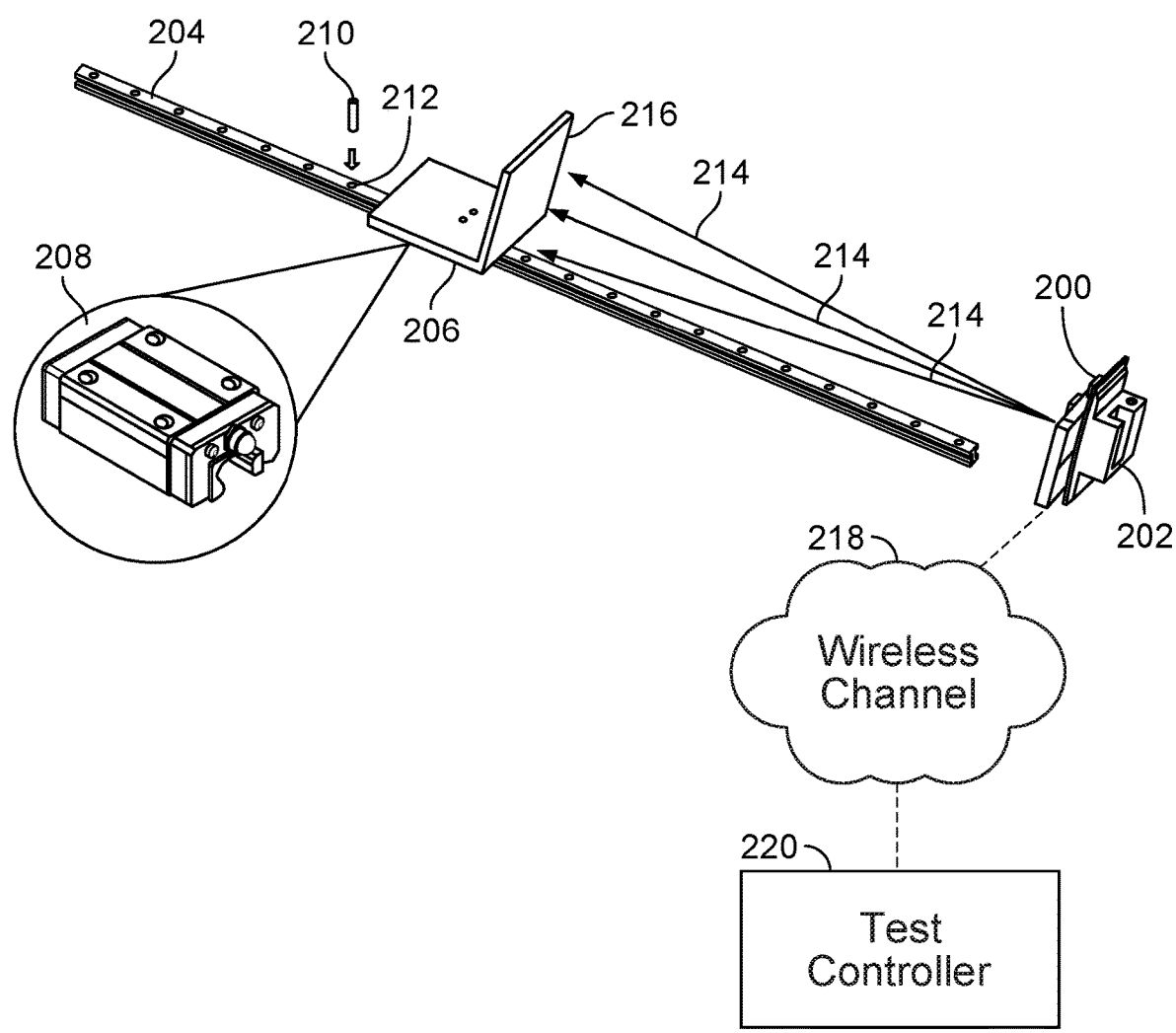
FIG. 2 is a diagram illustrating an embodiment of a system for testing an uninstalled distance sensor.

FIG. 2 is a diagram illustrating an embodiment of a system for testing an uninstalled distance sensor. In this example, the distance sensor (200) is not yet attached to and/or installed in some other and/or larger system. For example, this test setup may be used after the distance sensor has been manufactured but before the distance sensor has been installed in (as an example) a vehicle that uses the distance sensor to determine the vehicle's altitude. The distance sensor (200) in this example is held in place in a fixed and/or stationary position using a clamp-on vise (202). In some embodiments, the clamp-on vise is in turn anchored or otherwise secured to a bench or stand (not shown). In some embodiments, the clamp is coupled to the near end of the rail (204).

In this example, the L-shaped ground simulator (206) is moveable along a guide rail (204). A ground simulator is one type or example of a measured object referred to in FIG. 1. The vertical plane (216) of the ground simulator is used to test the distance sensor and the horizontal plane is coupled to a (e.g., ball bearing) carriage (208) which permits the ground simulator to move along the rail. The rail (204) includes holes (e.g., 212) at various locations or positions along the rail. To position the ground simulator (206) at some known distance to the distance sensor (200), a peg (210) is inserted into one of the holes (212) corresponding to some known distance. The ground simulator (206) on the carriage (208) moves along the rail (204) until the edge of the ground simulator comes into contact with the peg (210). The rail is on a level surface so the ground simulator will remain at that position while testing is performed. In some embodiments, two pegs are used to hold the ground simulator in place (e.g., one on the side facing the distance sensor and another on the opposite side of the ground simulator).

With the ground simulator at one of the known distances (e.g., at one of the pegged positions), one or more measurements from the distance sensor (200) are obtained at that position or distance. To measure distance, the distance sensor outputs a plurality of signals (214) at different angles. These signals may be radar signals, laser signals, etc. Although this example shows three signals at three different angles, any number of signals may be used. The dimensions of the planar surface (216) of the ground simulator are selected or otherwise designed to be sufficiently large so that most or all of the signals are reflected by the planar surface (216) back to the distance sensor (e.g., over all distances at which the ground sensor will be tested). Using the plurality of reflected signals (not shown), the distance sensor calculates or otherwise generates a measured distance.

In this example, the distance sensor outputs (e.g., broadcasts) the measured distance over a wireless channel (218). (Alternatively, in some other embodiments, the distance sensor has some output port via which the test controller and distance sensor can be coupled. Via this wired connection (not shown) the test controller can obtain the measured distance from the distance sensor.) A test controller (220) obtains the measured distance from the wireless channel and compares it to the known distance. For example, the test controller may be connected to the rail and carriage system and be able to control the distance at which the ground simulator is located from the distance sensor. The test controller thus knows the known or actual distance between the ground simulator and the distance sensor since it is controlling the rail and carriage system. The test system can then compare the measured distance against the known distance at one or more distances.

In some embodiments, there is a user interface (e.g., a display, a speaker, etc.) coupled to the test controller that indicates or otherwise signals the test result (e.g., displays a green light or the word "Pass" if the distance sensor passes testing or a red light or the word "Fail" if the distance sensor fails testing). The test can be repeated at different distances by moving the ground simulator (206) along the guide rail (204) and positioning the ground simulator using peg(s) and the holes.

In some embodiments, the distance sensor (200) is permitted to have some margin of error and still pass the test and the test equipment may configured to incorporate this information. For example, suppose a distance sensor is permitted to have ±5% error and still pass the test. In the example shown in FIG. 2 the test controller (220) would take a permitted error percentage into account when deciding whether a distance sensor has successfully measured a given distance or not.

The following figure describes this example more generally and/or formally in a flowchart.

Figure 3:
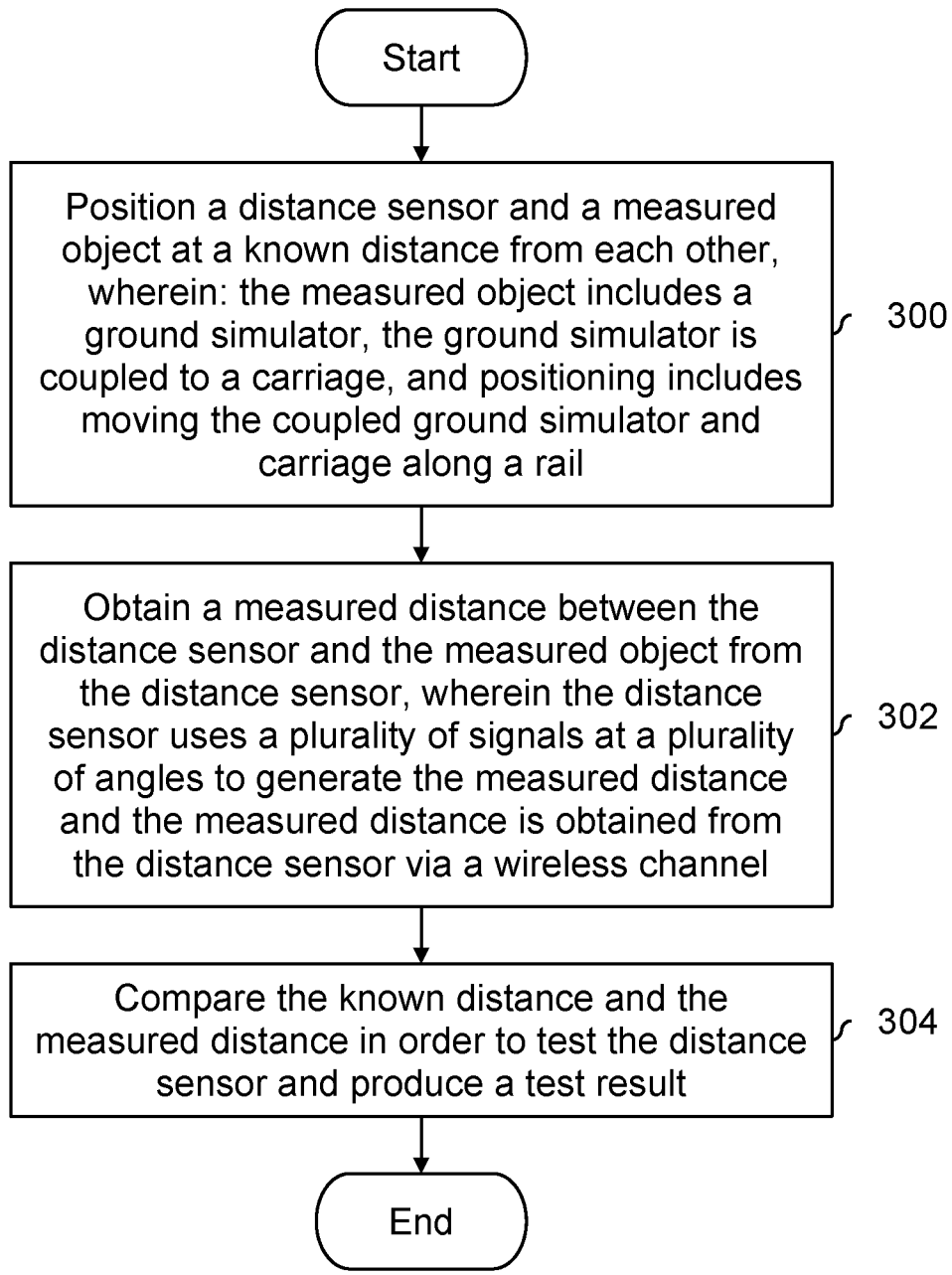
FIG. 3 is a flowchart illustrating an embodiment of a process to test a distance sensor using a rail and carriage system.

FIG. 3 is a flowchart illustrating an embodiment of a process to test a distance sensor using a rail and carriage system. In this example, the distance sensor is stationary and the ground simulator is moveable via the rail and carriage system. In various embodiments, the process may be performed by positioning equipment, a test controller, and/or a test user interface.

At 300, a distance sensor and a measured object are positioned at a known distance from each other, wherein: the measured object includes a ground simulator, the ground simulator is coupled to a carriage, and positioning includes moving the coupled ground simulator and carriage along a rail. See, for example, FIG. 2, where the ground simulator (206) is coupled to a carriage (208) and the coupled ground simulator and carriage are movable along a rail (204).

At 302, a measured distance between the distance sensor and the measured object is obtained from the distance sensor, wherein the distance sensor uses a plurality of signals at a plurality of angles to generate the measured distance and the measured distance is obtained from the distance sensor via a wireless channel. See, for example, FIG. 2 where the distance sensor (200) outputs its measured distance over a wireless channel (218).

At 304, the known distance and the measured distance are compared in order to test the distance sensor and produce a test result. As described above in the example of FIG. 2, the test controller controls the rail and carriage system and moves the coupled ground simulator and carriage along the rail, so that it always knows the actual distance between the measured object (in this case, a ground simulator) and the distance sensor. The measured distance is obtained from the distance sensor via the wireless channel and the two distances are compared in order to obtain a test result. The test result in those embodiments may then be presented in some user interface (not shown in FIG. 2).

As described above, in some embodiments, the distance sensor is attached to a vehicle when it is tested. The following figures show an example of such a vehicle and how a distance sensor attached to such a vehicle may be tested.

Figure 4:
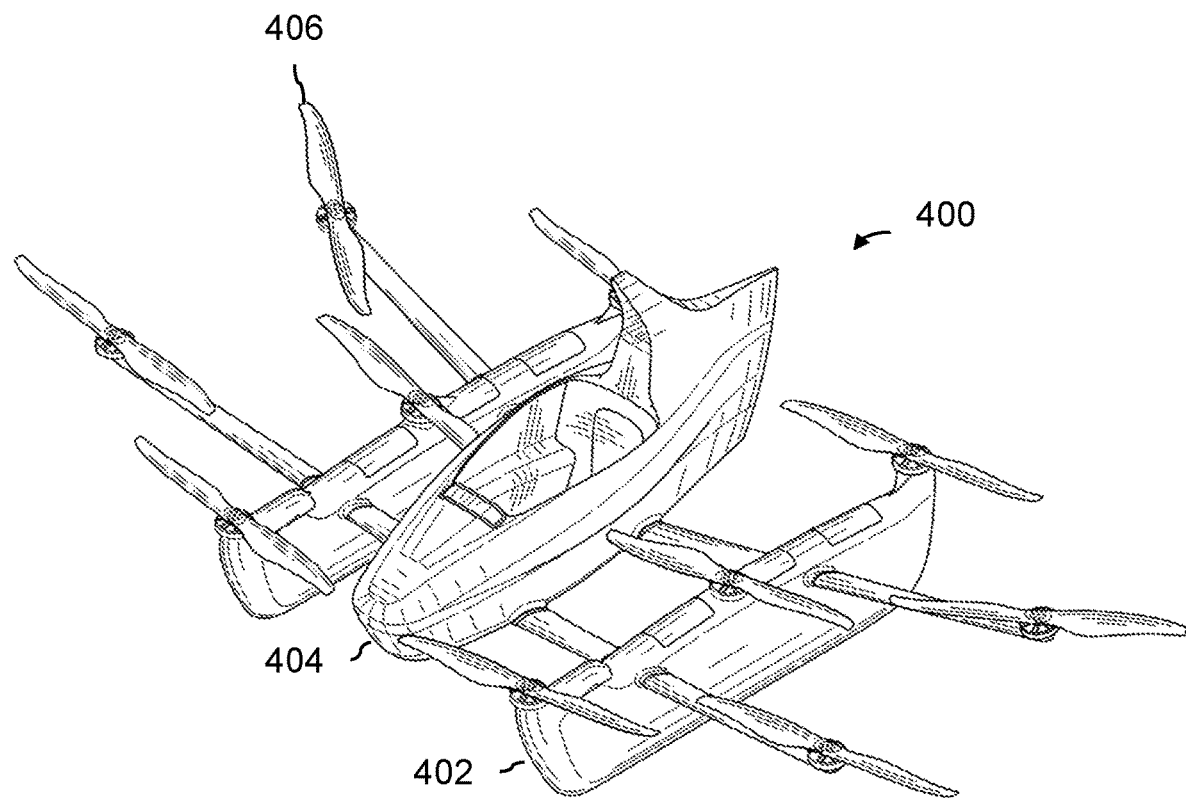
FIG. 4 is a diagram illustrating an embodiment of a multicopter which has a distance sensor mounted on the underside of its fuselage.

FIG. 4 is a diagram illustrating an embodiment of a multicopter which has a distance sensor mounted on the underside of its fuselage. In this example, the vehicle (400) is an ultralight, open-cockpit multicopter. The vehicle in this example is capable of taking off from and/or landing on water. To provide sufficient buoyancy when on the water, the vehicle includes two floats (402). The floats are also designed to have enough structural integrity so as to bear the weight of the vehicle and the pilot so that the vehicle is also capable of taking off from and/or landing on solid ground, as desired.

The distance sensor (not shown in this view) is attached to the underside of the fuselage (404). The bottom of the fuselage (404) is at a height that is higher than the bottom of the floats (402) so that there is some clearance between the ground and the underside of the fuselage when the vehicle is on the ground. This is also desirable because the distance sensor does not come into contact with the ground, which prevents damage.

In the following example, the exemplary vehicle is hoisted (or, more generally, elevated) in order to test the distance sensor. Although the examples described herein use the vehicle shown in FIG. 4 as an example, the testing techniques and/or systems described herein are applicable to a variety of vehicles.

Figure 5A:
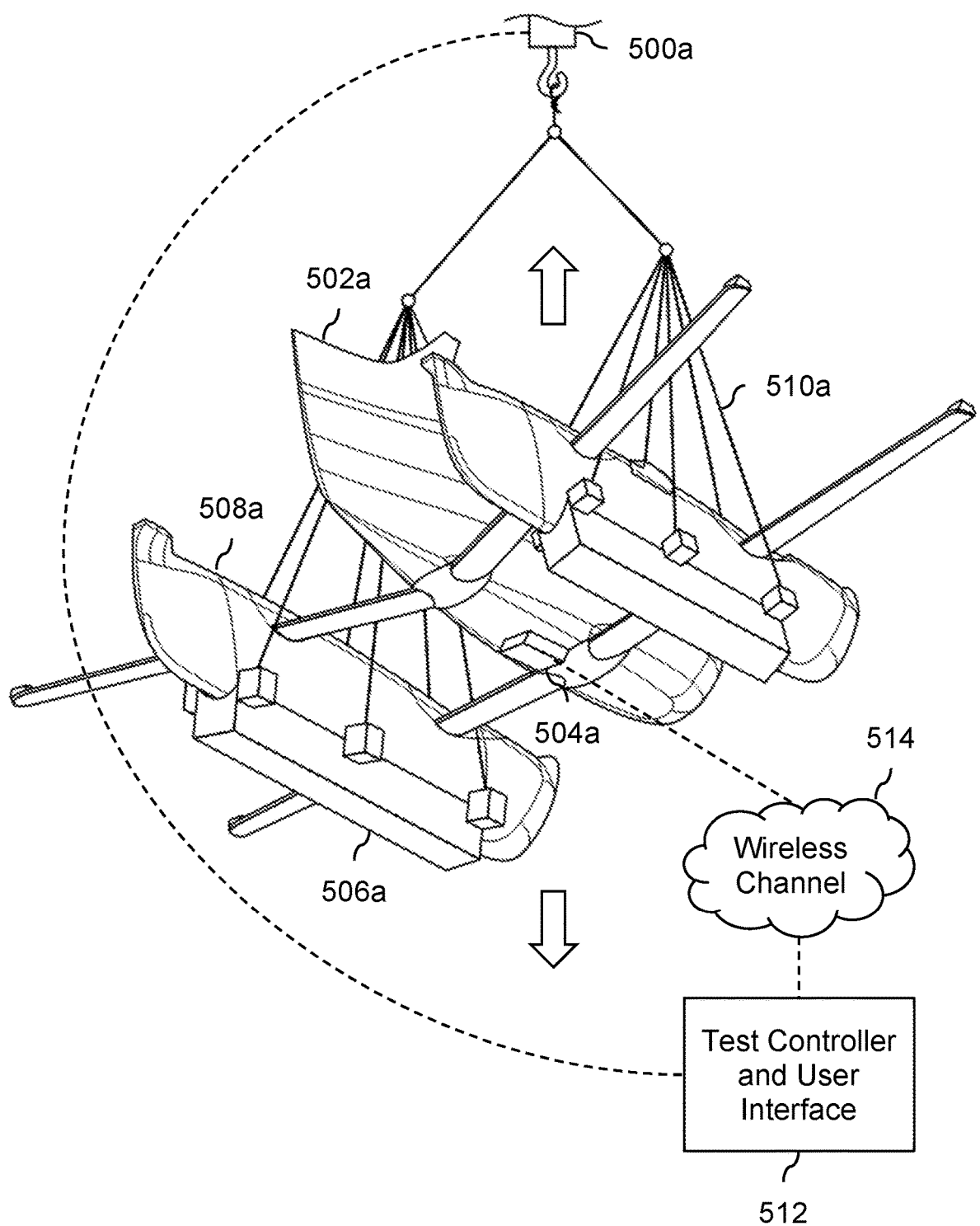
FIG. 5A is a perspective view of a test system embodiment which includes a pulley for testing a distance sensor which is attached to an ultralight multicopter.

FIG. 5A is a perspective view of a test system embodiment which includes a pulley for testing a distance sensor which is attached to an ultralight multicopter. To more clearly illustrate the test equipment, the propeller blades (406) shown in FIG. 4 are not shown here. Naturally, in a real test, the propeller blades may be kept on while testing a distance sensor.

In this example, a pulley system (500a) is used to lift and/or lower the vehicle (502a) so that the distance sensor (504a) and the measured object (in this case, the (actual) ground, not shown) are at a known distance. Before being attached to the pulley system, the vehicle, which is on the ground (not shown here), has two blocks (506a) placed underneath the floats (508a). For example, since the multicopter is an ultralight, a technician may stand between two of the booms and outside of the floats, grab the booms, and lift half of the vehicle while another technician slides one of the blocks beneath the raised boom. This process may be repeated on the other side. A system of ropes, ties, or lines (510a) is then connected to the blocks (506a) at one end and the pulley system (500a) at the other end.

Once the lines are connected, the testing process can begin. In this example, a technician initiates the test using the test controller and user interface (512). If needed, the distance sensor is turned on (e.g., wirelessly and/or remotely by the test controller and user interface (512) or manually by the technician, depending on how the distance sensor is implemented). Once a test is initiated, the controller and user interface (512) communicates with the pulley system (500a) to lift the vehicle so that the distance sensor is at a known height above the ground. In this example, the measured object is the actual ground (as opposed to some simulated ground). The distance sensor (504a) continuously measures and wirelessly outputs its measured distances over a wireless channel (514). The controller and user interface (512) obtains the measured distances from the wireless channel and compares it to the known height that the distance sensor is at (e.g., because it instructs the pulley system to position the vehicle at a specified, known height) and generates a test result (e.g., pass or fail). This test result is then displayed in the test controller and user interface (512). In some embodiments, testing is performed at multiple heights and the distance sensor must correctly and/or properly measure the distances at all of them in order to pass. As described above, there may be some permitted margin of error during testing.

The following figures show different perspectives of the testing system shown here.

Figure 5B:
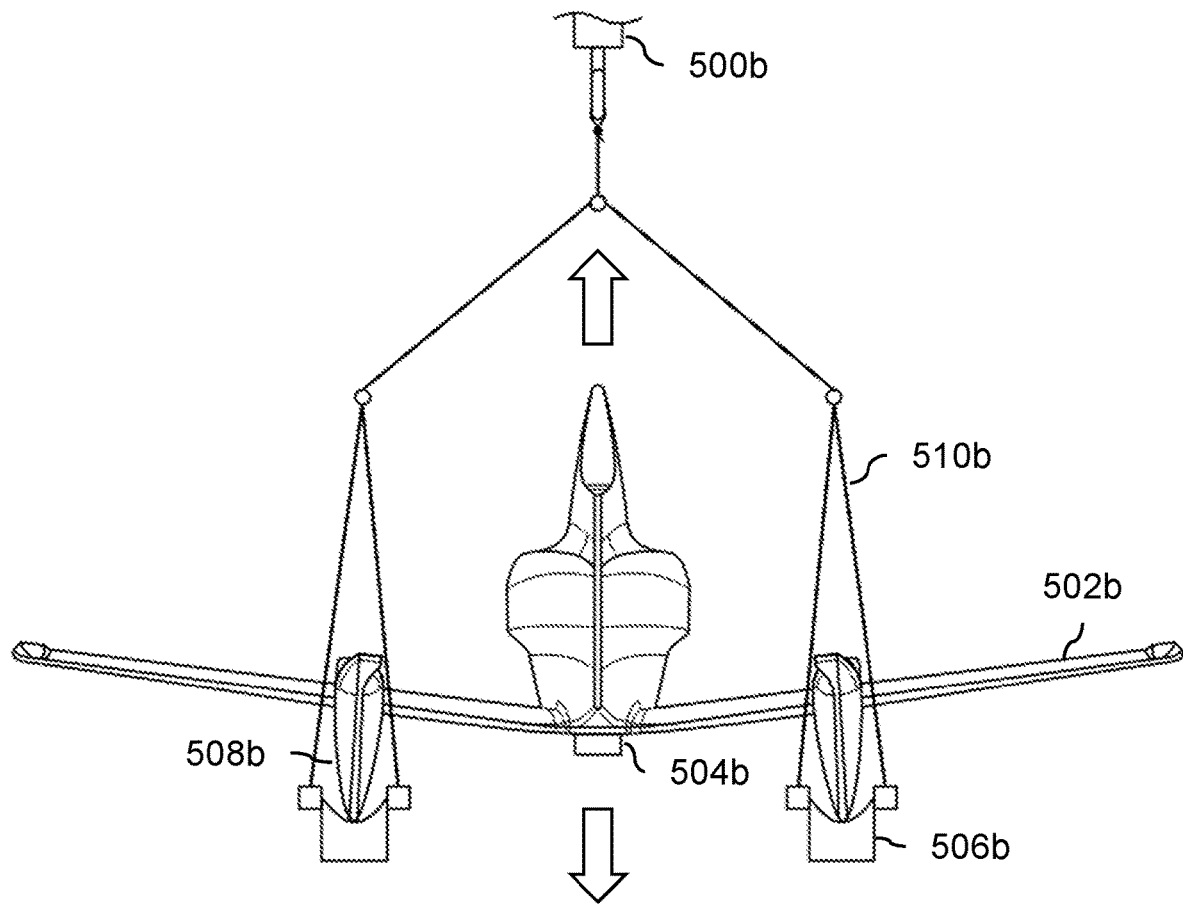
FIG. 5B is a front view of a test system embodiment which includes a pulley for testing a distance sensor which is attached to an ultralight multicopter.

FIG. 5B is a front view of a test system embodiment which includes a pulley for testing a distance sensor which is attached to an ultralight multicopter. For convenience and brevity, the test controller and user interface (512) and wireless channel (514) shown in FIG. 5A are not shown here. Similarly, the propeller blades are not shown.

From this front view, it can been seen how the pulley system (500b) is used to lift or lower the vehicle (502b) which has the distance sensor (504b) attached to the underside of its fuselage. To lift or lower the vehicle using the pulley system, two blocks (506b) are placed beneath the two floats (508b). Lines (510b) connect the pulley system (500b) to the blocks (506b).

Although not shown here, in some embodiments the blocks include wheels on the bottom of the blocks so that a vehicle can be easily wheeled around without damaging the bottom surface of the floats. This would make moving a float easier.

Figure 5C:
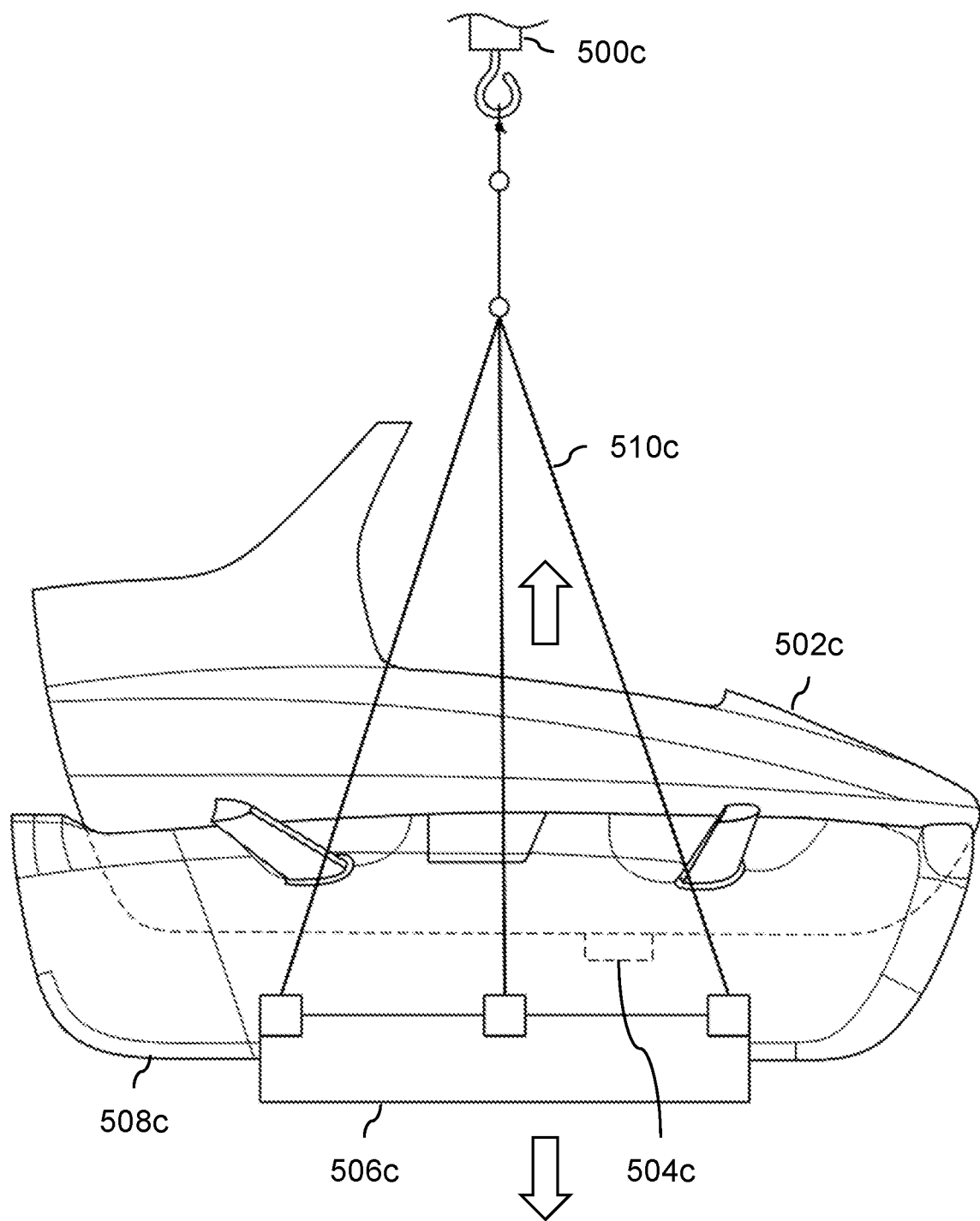
FIG. 5C is a front view of a test system embodiment which includes a pulley for testing a distance sensor which is attached to an ultralight multicopter.

FIG. 5C is a front view of a test system embodiment which includes a pulley for testing a distance sensor which is attached to an ultralight multicopter. As shown, the system includes the pulley (500c), the vehicle (502c), the distance sensor (504c), blocks (506c), floats (508c), and lines (510c).

The test setup shown in FIGS. 5A-5C may be desirable for a number for reasons. For one thing, the described pulley system may already be in use and/or already installed in some maintenance hangar or other service center. For example, part of a vehicle's maintenance or inspection routine may involve inspecting the underside of the vehicle for damage or tears (which is undesirable in a water landing) and lifting the vehicle from above using a pulley and lines may make it easier to perform such an inspection. Similarly, lifting the vehicle from above may make it easier to reach access panels, change parts, etc.

Another attractive feature of the setup shown in FIGS. 5A-5C is that it provides good (e.g., unimpeded) access to the underside of the vehicle. For example, an alternate solution may be to put the vehicle on some sort of lift (e.g., platform) which pushes the vehicle upwards from below. However, the lift platform and/or lifting mechanism of such a setup may impede access to the underside of the vehicle. This would interfere with distance sensor testing (e.g., because it could block a line-of-sight path between the distance sensor and the measured object) and/or other types of maintenance or testing (e.g., it may block the view of a technician trying to check the underside of the fuselage for scrapes, punctures, etc.). For these reasons, the setup shown in FIGS. 5A-5C may be attractive in some applications.

The following figure describes this example more generally and/or formally in a flowchart.

Figure 6:
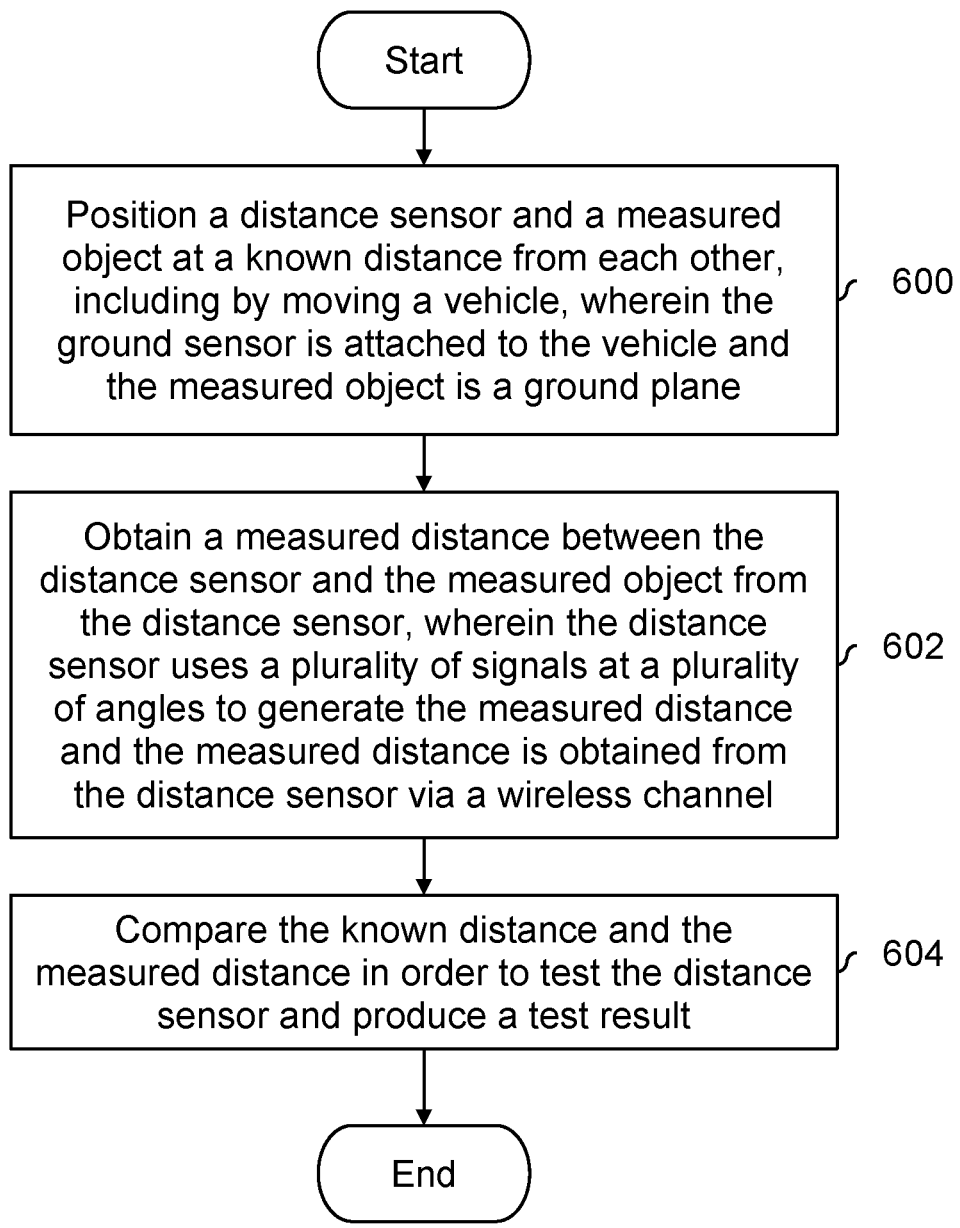
FIG. 6 is a flowchart illustrating an embodiment of a process to test a distance sensor by moving a vehicle to which the distance sensor is attached.

FIG. 6 is a flowchart illustrating an embodiment of a process to test a distance sensor by moving a vehicle to which the distance sensor is attached. In various embodiments, the process may be performed by positioning equipment, a test controller, and/or a test user interface.

At 600, a distance sensor and a measured object are positioned at a known distance from each other, including by moving a vehicle, wherein the ground sensor is attached to the vehicle and the measured object is a ground plane. See, for example, FIGS. 5A-5C where the positioning equipment includes a pulley system (500a-500c) which lifts or lowers the vehicle so that the distance sensor (504a-504c) and ground plane (not shown) are at a known height.

At 602, a measured distance between the distance sensor and the measured object is obtained from the distance sensor, wherein the distance sensor uses a plurality of signals at a plurality of angles to generate the measured distance and the measured distance is obtained from the distance sensor via a wireless channel. See, for example, FIG. 5A, where test controller and user interface (512) obtains the measured distance from the distance sensor (504a) via a wireless channel (514).

At 604, the known distance and the measured distance are compared in order to test the distance sensor and produce a test result. For example, the test result may be displayed in test controller and user interface (512) in FIG. 5A.

As shown in FIGS. 5A-5C, in some embodiments, the positioning equipment includes a pulley and moving the vehicle includes changing a height of the vehicle using the pulley. In some embodiments, the positioning equipment (further) includes a block which is located beneath a float of the vehicle, where one or more lines connect the pulley and the block (e.g., which is desirable because it permits relatively unimpeded access to the underside of the vehicle). In some embodiments, the block includes one or more wheels on a bottom surface (e.g., which is desirable because the float can be wheeled around when on the ground and on the blocks).

In some applications, the test setup shown in FIGS. 5A-5C may be undesirable. For example, the exemplary multicopter may sometimes be flown to remote locations where there is no access to the pulley-based test system shown in FIGS. 5A-5C. A smaller, more portable testing system may be desirable for such scenarios. The following figure shows an example of a smaller, more portable system for testing distance sensors that are attached to the underside of the exemplary multicopter shown in FIG. 4.

Figure 7:
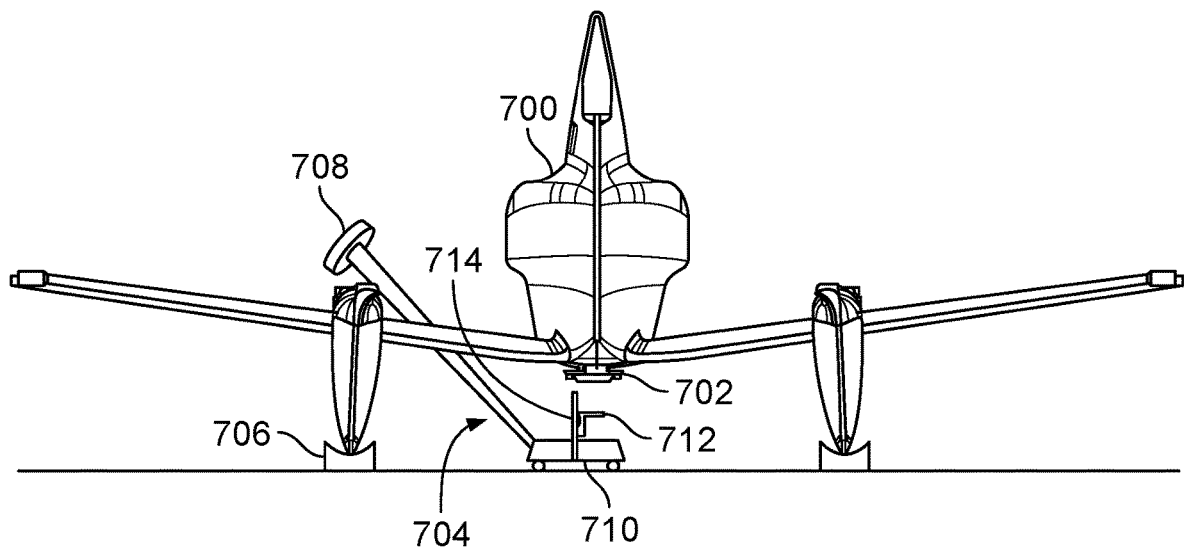
FIG. 7 is a back view illustrating an embodiment of a wheeled test system for testing a distance sensor attached to the underside of a vehicle.

FIG. 7 is a back view illustrating an embodiment of a wheeled test system for testing a distance sensor attached to the underside of a vehicle. In this example, the vehicle (700) with the distance sensor (702) attached to the underside of the vehicle is tested using the wheeled test system (704). As before, for clarity, the propeller blades are not shown in this figure.

In this example, the vehicle is on the ground, resting on two blocks (706) to protect the bottoms of the floats. As described above, in some embodiments, the blocks include wheels so that the vehicle can be moved around easily while on the blocks. As shown here, when on a flat surface, the bottom of the fuselage is elevated (e.g., on the order of 1-2 feet) above the ground. The wheeled test system (704) is wheeled under the fuselage, between the two floats so that it is below the distance sensor (702). In this example, the wheeled test system includes a handle (708) so that the wheeled base (710) of the system can more easily be moved and/or positioned.

Once the wheeled test system is properly positioned beneath the distance sensor, testing begins. The wheeled test system includes an L-shaped ground simulator (712) that is attached to a vertical rail (714), for example, via a carriage (not shown), similar to FIG. 2. The ground simulator (712) moves along the rail and tests the distance sensor at a variety of distances. As described above, the distance sensor outputs its measured distances via a wireless channel. The wheeled test system obtains the measured distances via the wireless channel, compares the measured distances against the known distances, and reports a test result (e.g., pass or fail) based on the comparison(s).

Naturally, the test system shown here is merely exemplary and may be implemented in a variety of ways. The following example shows a wheeled test system which (only) presents a planar surface to the distance sensor.

Figure 8:
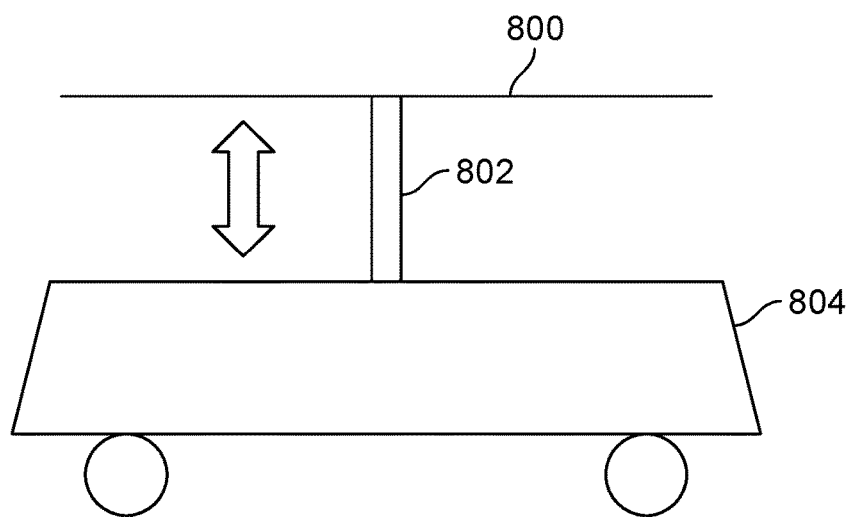
FIG. 8 is a diagram illustrating an embodiment of a wheeled test system which includes a planar ground simulator and a telescoping lift.

FIG. 8 is a diagram illustrating an embodiment of a wheeled test system which includes a planar ground simulator and a telescoping lift. In some applications, the vertical rail (714) shown in FIG. 7 may be undesirable because it may easily bend or break and/or may be a potential hazard (e.g., it could puncture someone or something). In this example, the wheeled test system includes a planar ground simulator (800) raised or lowered using a telescoping lift (802) from the base (804). For clarity and brevity, the exemplary wheeled test system does not include a handle. The telescoping lift is on the opposite side of the planar ground simulator as the distance sensor and vehicle (not shown). With this configuration, only the ground simulator (800) is presented to and/or visible to the distance sensor (not shown), which may ensure a more accurate test result because the distance sensor's signal(s) are not reflected off of a vertical rail, which could produce an inaccurate and/or undesirable measurement.

In various embodiments, a wheeled test system may include a variety of features (e.g., to make testing easier, to make the device easier to maneuver or position, etc.). In some embodiments, the wheeled test system includes brakes or wheel locks to keep the wheeled test system in position once the wheeled test system is properly positioned beneath the distance sensor. In some embodiments, the wheeled test system and/or vehicle includes some aide (e.g., visual and/or audible) to help properly position the wheeled test system beneath the distance sensor (e.g., display different colors and/or make different sounds when the wheeled test system is properly positioned versus improperly positioned for testing). In some embodiments, the handle includes a button to initiate testing (e.g., so that a technician does not have to bend down to touch the base of the wheeled test system to begin testing). In some embodiments, the wheeled test system communicates wirelessly with the distance sensor to turn on the distance sensor (e.g., so that a technician does not have to bend down and manually flip an on/off switch on the distance sensor, which may be difficult to access). In some embodiments, the base displays the test result(s).

The following figure describes this example more generally and/or formally in a flowchart.

Figure 9:
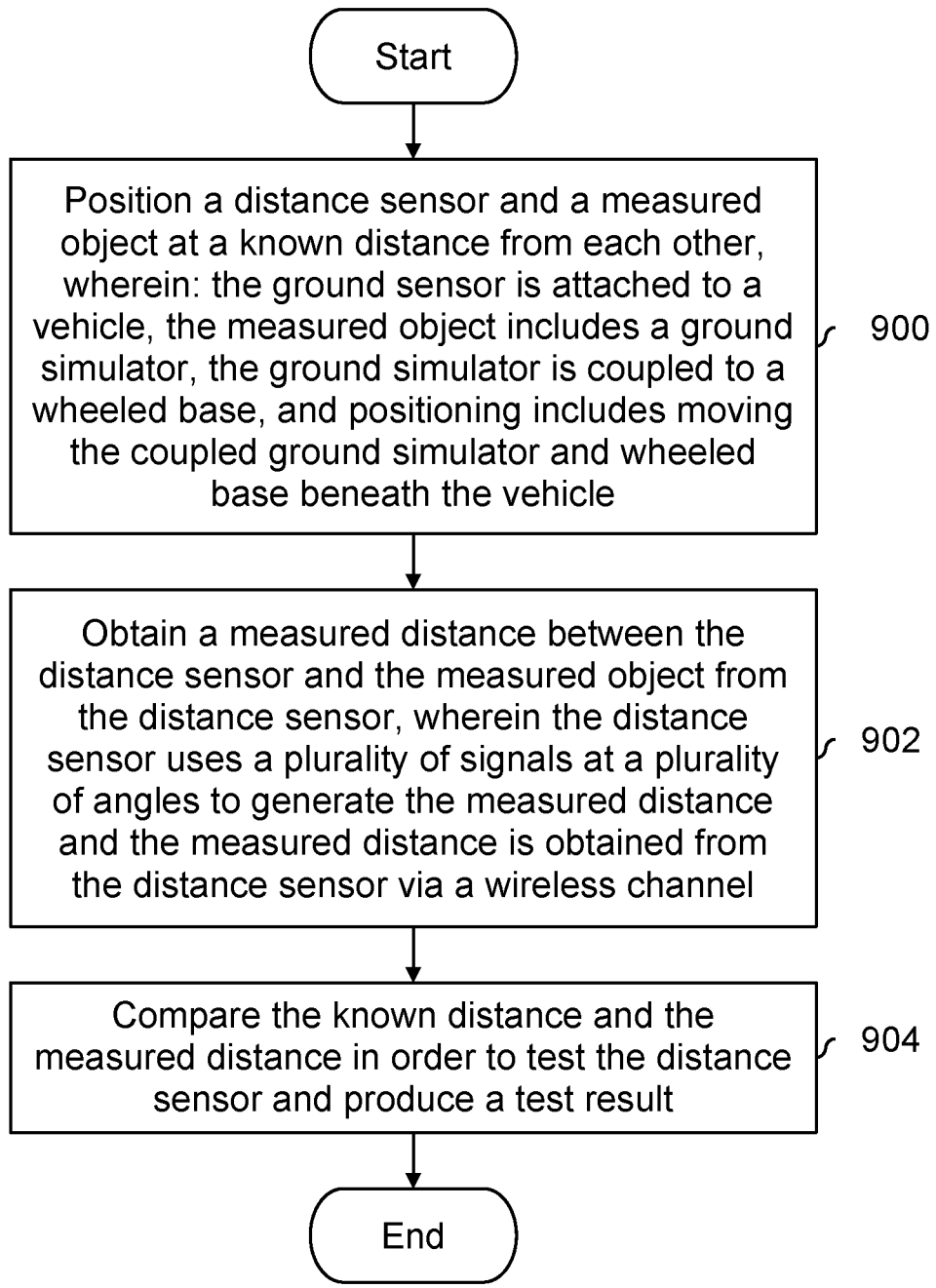
FIG. 9 is a flowchart illustrating an embodiment of a process to test a distance sensor that is attached to a vehicle using a test system that includes a wheeled base.

FIG. 9 is a flowchart illustrating an embodiment of a process to test a distance sensor that is attached to a vehicle using a test system that includes a wheeled base.

At 900, a distance sensor and a measured object are positioned at a known distance from each other, wherein: the ground sensor is attached to a vehicle, the measured object includes a ground simulator, the ground simulator is coupled to a wheeled base, and positioning includes moving the coupled ground simulator and wheeled base beneath the vehicle. See, for example, FIG. 7, where wheeled test system 704 is used to test ground sensor 702.

At 902, a measured distance between the distance sensor and the measured object is obtained from the distance sensor, wherein the distance sensor uses a plurality of signals at a plurality of angles to generate the measured distance and the measured distance is obtained from the distance sensor via a wireless channel.

At 904, the known distance and the measured distance are compared in order to test the distance sensor and produce a test result.

As described above, in some embodiments, the measured distance is obtained by the wheeled base from the distance sensor via a wireless channel (e.g., at step 902), the known distance and the measured distance are compared on the wheeled base (e.g., at step 904), and a test result produced by comparing the known distance and the measured distance is displayed by the wheeled base (e.g., wheeled base 710 in FIG. 7 or wheeled base 804 in FIG. 8).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   equipment that is configured to position a distance sensor and a measured object at a known distance from each other, wherein:
   the distance sensor includes one or more of the following: a radar based distance sensor or a Lidar based distance sensor;
   the measured object is a ground simulator;
   the ground simulator is coupled to a ball bearing carriage and configured to move via the ball bearing carriage; and
   positioning includes:
   inserting at least one peg into at least one of a plurality of holes provided along a longitudinal axis of a guard rail and corresponding to known distances from the measured object, and
   rolling the ball bearing carriage along the guide rail to a position where an edge of the ground simulator comes into contact with the at least one peg; and
   a test controller that is configured to:
   obtain, from the distance sensor, a measured distance between the distance sensor and the ground simulator included in the measured object, wherein:
   the distance sensor transmits a plurality of signals at different angles to generate the measured distance; and
   the plurality of signals includes one or more of the following: a plurality of radar signals or a plurality of Lidar signals; and
   compare the known distance and the measured distance in order to test the distance sensor and produce a test result.

2. The system of claim 1, wherein:
   the measured distance is obtained from the distance sensor via a wireless channel.

3. The system of claim 1, wherein the ground simulator includes:
   a horizontal plane coupled to the ball bearing carriage, and
   a vertical plane simulating a ground surface and configured to reflect signals back to the distance sensor.

4. A method, comprising:
   positioning a distance sensor and a measured object at a known distance from each other, wherein:
   the distance sensor includes one or more of the following: a radar based distance sensor or a Lidar based distance sensor;
   the measured object is a ground simulator;
   the ground simulator is coupled to a ball bearing carriage and configured to move via the ball bearing carriage; and
   positioning includes:
   inserting at least one peg into at least one of a plurality of holes provided along a longitudinal axis of a guard rail and corresponding to known distances from the measured object, and
   rolling the ball bearing carriage along the guide rail to a position where an edge of the ground simulator comes into contact with the at least one peg; and
   obtaining, from the distance sensor, a measured distance between the distance sensor and the ground simulator included in the measured object, wherein:
   the distance sensor transmits a plurality of signals at different angles to generate the measured distance; and
   the plurality of signals includes one or more of the following: a plurality of radar signals or a plurality of Lidar signals; and
   comparing the known distance and the measured distance in order to test the distance sensor and produce a test result.

5. The method of claim 4, wherein:
   the measured distance is obtained from the distance sensor via a wireless channel.

6. A computer program product, the computer program product being embodied in a non-transitory computer readable storage medium and comprising computer instructions for:
   positioning a distance sensor and a measured object at a known distance from each other, wherein:

the distance sensor includes one or more of the following: a radar based distance sensor or a Lidar based distance sensor;
the measured object is a ground simulator;
the ground simulator is coupled to a ball bearing carriage and configured to move via the ball bearing carriage; and
positioning includes rolling the ball bearing carriage along the guide rail to a position where an edge of the ground simulator comes into contact with at least one peg, the at least one peg being provided in at least one of a plurality of holes along a longitudinal axis of a guard rail and corresponding to known distances from the measured object; and obtaining, from the distance sensor, a measured distance between the distance sensor and the ground simulator included in the measured object, wherein:
the distance sensor transmits a plurality of signals at different angles to generate the measured distance; and
the plurality of signals includes one or more of the following: a plurality of radar signals or a plurality of Lidar signals; and comparing the known distance and the measured distance in order to test the distance sensor and produce a test result.

7. The computer program product of claim 6, wherein: the measured distance is obtained from the distance sensor via a wireless channel.

* * * * *